US010713569B2

United States Patent
Ros Sanchez et al.

(10) Patent No.: US 10,713,569 B2
(45) Date of Patent: Jul. 14, 2020

(54) SYSTEM AND METHOD FOR GENERATING IMPROVED SYNTHETIC IMAGES

(71) Applicant: Toyota Research Institute, Inc., Los Altos, CA (US)

(72) Inventors: German Ros Sanchez, San Francisco, CA (US); Adrien D. Gaidon, Mountain View, CA (US); Kuan-Hui Lee, Redwood City, CA (US); Jie Li, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 222 days.

(21) Appl. No.: 15/994,217

(22) Filed: May 31, 2018

(65) Prior Publication Data

US 2019/0370666 A1    Dec. 5, 2019

(51) Int. Cl.
*G06N 3/08* (2006.01)
*G06T 5/50* (2006.01)

(52) U.S. Cl.
CPC ............ *G06N 3/088* (2013.01); *G06T 5/50* (2013.01); *G06T 2207/20081* (2013.01); *G06T 2207/20084* (2013.01); *G06T 2207/30252* (2013.01)

(58) Field of Classification Search
CPC ............ G06T 5/50; G06T 2207/20081; G06T 2207/20084; G06T 2207/30252; G06N 3/088; G06K 2209/05
USPC ....................................................... 382/156
See application file for complete search history.

(56) References Cited

U.S. PATENT DOCUMENTS

| | | | |
|---|---|---|---|
| 9,786,084 B1 | 10/2017 | Bhat et al. | |
| 10,540,798 B1* | 1/2020 | Walters | G06T 11/60 |
| 2017/0345140 A1 | 11/2017 | Zhang et al. | |
| 2017/0351952 A1 | 12/2017 | Zhang et al. | |
| 2019/0080206 A1* | 3/2019 | Hotson | G06K 9/6264 |

OTHER PUBLICATIONS

Bousmalis, et al., "Unsupervised Pixel-Level Domain Adaptation with Generative Adversarial Networks," arXiv:1612.05424v2 [cs.CV] Aug. 23, 2017.
Chen, et al., "Recognizing RGB Images by Learning from RGB-D Data," 2014 IEEE Conference on Computer Vision and Pattern Recognition, pp. 1418-1425 (2014).

(Continued)

*Primary Examiner* — Daniel G Mariam
(74) *Attorney, Agent, or Firm* — Christopher G. Darrow; Darrow Mustafa PC

(57) ABSTRACT

System, methods, and other embodiments described herein relate to improving the generation of realistic images. In one embodiment, a method includes acquiring a synthetic image including identified labels of simulated components within the synthetic image. The synthetic image is a simulated visualization and the identified labels distinguish between the components within the synthetic image. The method includes computing, from the simulated components, translated components that visually approximate real instances of the simulated components by using a generative module comprised of neural networks that are configured to separately generate the translated components. The method includes blending the translated components together to produce a new image from the simulated components of the synthetic image.

20 Claims, 6 Drawing Sheets

(56) References Cited

OTHER PUBLICATIONS

Chen, et al., "Photographic Image Synthesis with Cascaded Refinement Networks," arXiv:1707.09405v1 [cs.CV] Jul. 28, 2017.
Chen, et al., "No More Discrimination: Cross City Adaptation of Road Scene Segmenters," arXiv:1704.08509v1 [cs.CV] Apr. 27, 2017.
Cordts, et al., "The Cityscapes Dataset for Semantic Urban Scene Understanding," arXiv:1604.01685v2 [cs.CV] Apr. 7, 2016.
Dai, et al., "Good Semi-Supervised Learning that Requires a Bad GAN," arXiv:1705.09783v3 [cs.LG] Nov. 3, 2017.
De Souza, et al., "Procedural Generation of Videos to Train Deep Action Recognition Networks," arXiv:1612.00881v2 [cs.CV] Jul. 19, 2017.
Ganin, et al., "Unsupervised Domain Adaptation by Backpropagation," arXiv:1409.7495v2 [stat.ML] Feb. 27, 2015.
Ganin, et al., "Domain-Adversarial Training of Neural Networks," arXiv:1505.07818v4 [stat.ML] May 26, 2016.
Goodfellow, et al., "Generative Adversarial Nets," arXiv:1406.2661v1 [stat.ML] Jun. 10, 2014.
Handa, et al., "SceneNet: Understanding Real World Indoor Scenes with Synthetic Data," arXiv:1511.07041v2 [cs.CV] Nov. 26, 2015.
He, et al., "Deep Residual Learning for Image Recognition," arXiv:1512.03385v1 [cs.CV] Dec. 10, 2015.
Herath, et al., "Learning an Invariant Hilbert Space for Domain Adaptation," arXiv:1611.08350v2 [cs.CV] Apr. 17, 2017.
Hinton, et al., "Distilling the Knowledge in a Neural Network," arXiv:1503.02531v1 [stat.ML] Mar. 9, 2015.
Hoffman, et al., "Efficient Learning of Domain-invariant Image Representations," arXiv:1301.3224v5 [cs.LG] Apr. 9, 2013.
Johnson, et al., "Perceptual Losses for Real-Time Style Transfer and Super-Resolution," arXiv:1603.08155v1 [cs.CV] Mar. 27, 2016.
Karras, et al., "Progressive Growing of GANs for Improved Quality, Stability, and Variation," arXiv:1710.10196v3 [cs.NE] Feb. 26, 2018.
Kim, et al., "Learning to Discover Cross-Domain Relations with Generative Adversarial Networks," arXiv:1703.05192v2 [cs.CV] May 15, 2017.
Kingma, et al., "Adam: A Method for Stochastic Optimization," arXiv:1412.6980v9 [cs.LG] Jan. 30, 2017.
Lapin, et al., "Learning Using Privileged Information: SVM+ and Weighted SVM," arXiv:1306.3161v2 [stat.ML] Mar. 2, 2014.
Li, et al., "Exploiting Privileged Information from Web Data for Image Categorization," Springer International Publishing Switzerland, pp. 437-452 (2014).
Liu, et al., "Unsupervised Image-to-Image Translation Networks," arXiv:1703.00848v6 [cs.CV] Jul. 23, 2018.
Long, et al., "Learning Transferable Features with Deep Adaptation Networks," arXiv:1502.02791v2 [cs.LG] May 27, 2015.
Lopez-Paz, et al., "Unifying Distillation and Privileged Information," arXiv:1511.03643v3 [stat.ML] Feb. 26, 2016.
Mao, et al., "Multiclass Generative Adversarial Networks With the l2 Loss Function", arXiv preprint arXiv:1611.04076, 2016. 3.
Marin, et al., "Learning Appearance in Virtual Scenarios for Pedestrian Detection," Computer Vision Center and Computer Science Dpt (2010).
Mayer, et al., "A Large Dataset to Train Convolutional Networks for Disparity, Optical Flow, and Scene Flow Estimation," arXiv:1512.02134v1 [cs.CV] Dec. 7, 2015.
Neuhold, et al., "The Mapillary Vistas Dataset for Semantic Understanding of Street Scenes," The IEEE International Conference on Computer Vision (ICCV), pp. 4990-4999 (2017).
Papon, et al., "Semantic Pose using Deep Networks Trained on Synthetic RGB-D," arXiv:1508.00835v1 [cs.CV] Aug. 4, 2015.

Peng, et al., "Learning Deep Object Detectors from 3D Models," arXiv:1412.7122v4 [cs.CV] Oct. 12, 2015.
Purushotham, et al., "Variational Recurrent Adversarial Deep Domain Adaptation," International Conference on Learning Representations (ICLR), pp. 1-15 (2017).
Richter, et al., "Playing for Data: Ground Truth from Computer Games," arXiv:1608.02192v1 [cs.CV] Aug. 7, 2016.
Ros, et al., "The SYNTHIA Dataset: A Large Collection of Synthetic Images for Sematic Segmentation of Urban Scenes," 2016 IEEE Conference on Computer Vision and Pattern Recognition (CVPR), pp. 4321-4330 (2016).
Sarafianos, et al., "Adaptive SVM+: Learning with Privileged Information for Domain Adaptation," arXiv:1708.09083v1 [cs.CV] Aug. 30, 2017.
Shotton, et al., "Real-Time Human Pose Recognition in Parts from Single Depth Images," 2011 IEEE Conference on Computer Vision and Pattern Recognition (CVPR), (2011).
Su, et al., "Render for CNN: Viewpoint Estimation in Images Using CNNs Trained with Rendered 3D Model Views," arXiv:1505.05641v1 [cs.CV] May 21, 2015.
Sun, et al., "From Virtual to Reality: Fast Adaptation of Virtual Object Detectors to Real Domains," Proceedings of the British Machine Vision Conference. BMVA Press, Sep. 2014.
Taigman, et al., "Unsupervised Cross-Domain Image Generation," arXiv:1611.02200v1 [cs.CV] Nov. 7, 2016.
Tzeng, et al., "Deep Domain Confusion: Maximizing for Domain Invariance," arXiv:1412.3474v1 [cs.CV] Dec. 10, 2014.
Vapnik, et al., "A new learning paradigm: Learning using privileged information," Neural Networks, vol. 22, Issues 5-6, pp. 544-557 (2009).
Witten, et al., "Data Mining: Practical Machine Learning Tools and Techniques," Morgan Kaufmann Publishers, Second Edition, pp. 1-525 (2005).
Xu, et al., "Learning a Part-Based Pedestrian Detector in a Virtual World," IEEE Transactions on Intelligent Transportation Systems, pp. 1-10 (2014).
Yan, et al., "Learning Domain-INvariant Subspace using Domain Features and Independence Maximization," arXiv:1603.04535v2 [cs.CV] Jun. 22, 2017.
Zhang, et al., "A Curriculum Domain Adaptation Approach to Semantic Segmentation of Urban Scenes," arXiv:1707.09465v3 [cs.CV] Jun. 5, 2018.
Vazquez, et al., "Virtual and Real World Adaptation for Pedestrian Detection," T-PAMI, 36(4):797-809, 2014.
Peng et al., "Synthetic to Real Adaptation with Generative Correlation Alignment Networks," arXiv:1701.05524v3 [cs.CV] Mar. 18, 2017.
Jing et al., "Neural Style Transfer: A Review," arXiv:1705.04058v1 [cs.CV] May 11, 2017.
Luan et al, "Deep Photo Style Transfer," arXiv:1703.07511v3 [cs.CV] Apr. 11, 2017.
Goodfellow, et al. "Generative adversarial networks", arXiv:1406.2661v1 [stat.ML] Jun. 10, 2014.
Shrivastava, et al., "Learning from Simulated and Unsupervised Images through Adversarial Training", arXiv:1612.07828v2 [cs.CV] Jul. 19, 2017.
Isola, et al., Image-to-Image Translation with Conditional Adversarial Networks, arXiv:1611.07004v2 [cs.CV] Nov. 22, 2017.
Gaidon, et al. "Virtual Worlds as Proxy for Multi-Object Tracking Analysis", arXiv:1605.06457v1 [cs.CV] May 20, 2016.
Zhu, et al., "Unpaired image-to-image translation using Cycle-Consistent Adversarial Networks," arXiv:1703.10593v4 [cs.CV] Feb. 19, 2018.
Zhang, et al. "StackGAN++: Realistic Image Synthesis with Stacked Generative Adversarial Networks," arXiv:1710.10916v2 [cs.CV] Dec. 25, 2017.

* cited by examiner

SYSTEM AND METHOD FOR GENERATING IMPROVED SYNTHETIC IMAGES

TECHNICAL FIELD

The subject matter described herein relates, in general, to systems and methods for electronically generating images, and, in particular, to translating synthetic images into photo-realistic images using a plurality of neural networks to generate sub-components of the images.

BACKGROUND

Machine perception and understanding of electronic information can represent a difficult task. For example, robots generally use electronic sensors such as cameras, LiDAR, and other sensors to acquire information about a surrounding environment. The information can take different forms such as still images, video, point clouds, and so on. However, understanding the contents of the information can be a complex task. In one approach, a machine learning algorithm may be employed to perform a particular perception task such as detecting obstacles within provided image data. While machine learning algorithms can be effective at such tasks, an accuracy of such approaches generally depends on the quantity, diversity, and quality of training examples that the machine learning algorithm uses to learn the task.

However, acquiring this breadth and quantity of training data can represent a significant hurdle to training the algorithm. For example, collecting actual sensor data for such a task generally involves driving a vehicle over many miles and through many different environments to collect raw data, which is then manually labeled to provide annotations in the data that can be used by the algorithm for training. As such, manually collecting and labeling sensor data is generally inefficient and often includes inaccuracies from errors introduced through the manual labeling process.

Moreover, in further approaches, a machine learning algorithm learns a perception task using simulated data such as synthetic images. When, for example, a simulator produces a synthetic image, objects, and configurations of the objects within the synthetic image are generally known or are at least easily labeled through automated processes because of the nature of the synthetic image. Accordingly, using synthetic images can avoid inefficiencies associated with the manual labeling process. However, synthetic images do not represent environments in a photo-realistic manner. As a result of this discrepancy in realism, the synthetic images can introduce a gap within the understanding of the machine learning model when used as a training source. Accordingly, difficulties with accurately training such models persist.

SUMMARY

In one embodiment, example systems and methods relate to a manner of using a plurality of purpose-built generative models to improve the photorealism of synthetic images. Thus, the disclosed approach improves on the advantages of synthetic images by using an arrangement of generative adversarial networks to improve the realism of the synthetic images and thereby provide photo-realistic synthetic images that include accurate labeling. In this way, the disclosed approach overcomes the shortcomings of non-realistic synthetic images including inconsistencies and artifacts that can be present within the synthetic images. Therefore, the gap previously realized in training machine learning models using synthetic images in comparison to real images is overcome by the improvements of the present disclosure since the presently disclosed system and methods can generate improved images that are photorealistic and can be custom generated to suit individual training applications while avoiding issues with manual collection and labeling.

In one embodiment, a mapping system for improving the generation of realistic images is disclosed. The mapping system includes one or more processors and a memory communicably coupled to the one or more processors. The memory stores an image module including instructions that when executed by the one or more processors cause the one or more processors to acquire a synthetic image including identified labels of simulated components within the synthetic image. The synthetic image is a simulated visualization and the identified labels distinguish between the simulated components within the synthetic image. The memory stores a translation module including instructions that when executed by the one or more processors cause the one or more processors to compute, from the simulated components, translated components that visually approximate real instances of the simulated components by using a generative module comprised of neural networks that are configured to separately generate the translated components. The translation module includes instructions to blend the translated components together to produce a new image from the simulated components of the synthetic image.

In one embodiment, a non-transitory computer-readable medium including instructions that when executed by one or more processors cause the one or more processors to perform one or more functions. The instructions include instructions to acquire a synthetic image including identified labels of simulated components within the synthetic image. The synthetic image is a simulated visualization, and the identified labels distinguish between the simulated components within the synthetic image. The instructions include instructions to compute, from the simulated components, translated components that visually approximate real instances of the simulated components by using a generative module comprised of neural networks that are configured to separately generate the translated components. The instructions include instructions to blend the translated components together to produce a new image from the simulated components of the synthetic image.

In one embodiment, a method for improving the generation of realistic images is disclosed. In one embodiment, the method includes acquiring a synthetic image including identified labels of simulated components within the synthetic image. The synthetic image is a simulated visualization and the identified labels distinguish between the components within the synthetic image. The method includes computing, from the simulated components, translated components that visually approximate real instances of the simulated components by using a generative module comprised of neural networks that are configured to separately generate the translated components. The method includes blending the translated components together to produce a new image from the simulated components of the synthetic image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
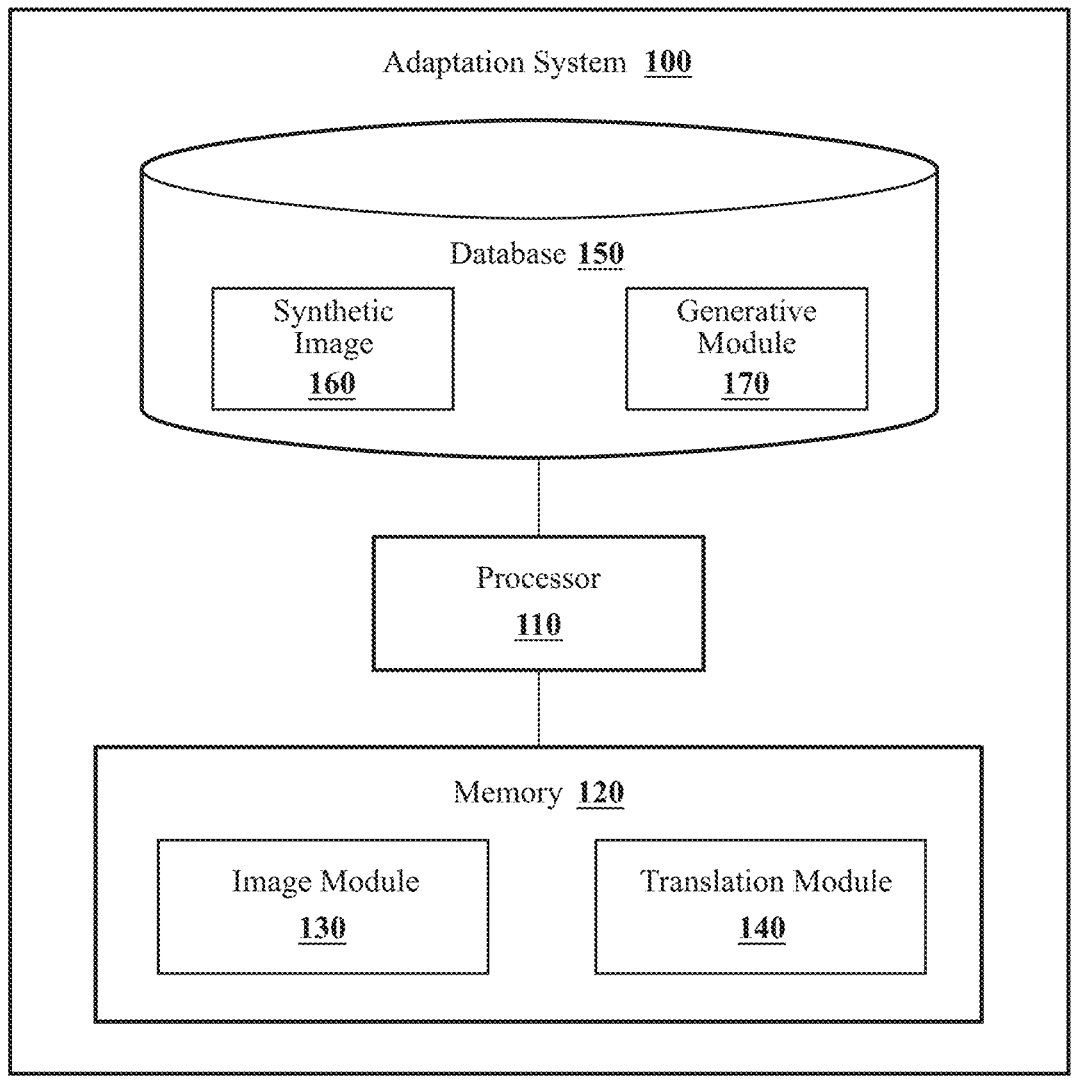
FIG. 1 illustrates one embodiment of an adaptation system that is associated with generating improved images from synthetic images.

Systems, methods, and other embodiments associated with using an arrangement of machine learning models to transform sub-components within a synthetic image into a photo-realistic form are disclosed. As mentioned previously, using synthetic images to train machine learning models generally results in the models suffering from gaps in understanding because of non-realistic aspects of the synthetic images such as lighting, textures, and other aspects that can cause the synthetic images to lack realism. Moreover, the process of generating the synthetic images can result in discrepancies between the synthetic images and real-world images including image artifacts (e.g., noise, distortion, color banding, etc.) and inconsistencies (e.g., variations in colors, etc.). In either case, such shortcomings within the synthetic images themselves carry over into the training of the machine learning models such that the models generally do not perform to the same standards as when trained with real images.

Therefore, in one embodiment, an adaptation system uses synthetic images from a simulator or other electronic source and transforms the synthetic images into photo-realistic images. That is, the adaptation system, in one embodiment, initially acquires a synthetic image that is computer-generated. The synthetic image visually depicts a scene such as a driving scene (e.g., roadway with various object instances). In one approach, the synthetic image is pre-labeled with indications of objects classes (e.g., road, car, sidewalk, etc.) for separate object instances depicted therein. In further aspects, the adaptation system may separately label objects depicted with the synthetic image. In either case, the synthetic image itself is generally provided for training a particular machine learning model on a particular task and thus includes combinations of objects that may benefit such training along with labels identifying the objects. As such, the adaptation system is aware of the presence of the different object instances and locations of those instances within the synthetic image.

Consequently, the adaptation system generates a new/improved image from the synthetic image by separately translating the different object instances within the synthetic image into photo-realistic versions. In one embodiment, the adaptation system implements a generative module to perform the translation. The generative module may take different forms depending on a particular implementation but generally includes an arrangement of machine learning models such that, for example, separate ones of the models or combinations of the models that correspond with the separate labels translate the components within the synthetic image. In one embodiment, the machine learning models are arranged in a stack, while in further embodiments, the models are arranged into a hierarchy. In either case, the models can separately translate the different object instances within the new image from the instances as depicted in the synthetic image.

Moreover, the machine learning models that form the generative module are, for example, generative adversarial networks (GANs), cycle consistent GANs, or another form of generative model that produces photo-realistic components of images from synthetic components. Thus, the adaptation system uses the generative module to produce components of the new image and further blends the separate translated components together into a new image that is photo-realistic. Subsequently, the adaptation system can provide the new images and corresponding labels for training further models on specific tasks. In this way, the adaptation system improves the generation of labeled training data such that realistic depictions of various scenes including labels of objects in the scenes can be efficiently generated in lieu of using manual processes and while avoiding shortcomings of using synthetic images that lack realism.

Referring to FIG. 1, one embodiment of an adaptation system 100 that is implemented to perform methods and other functions as disclosed herein relating to image translation for adapting synthetic images into photo-realistic images is illustrated. It should be appreciated, that while the adaptation system 100 is illustrated as being a single contained system, in various embodiments, the adaptation system 100 is a distributed system that is comprised of components that can be provided as a centralized server, a cloud-based service, and so on.

As an additional note, while the adaptation system 100 is generally applicable to many different contexts within which machine learning algorithms may be implemented, in one or more embodiments, the adaptation system 100 is implemented to at least support functions of an advanced driving assistance system (ADAS) and/or an autonomous driving module that provides autonomous driving (i.e., self-driving) functionality to a vehicle. For example, the autonomous driving module, in one embodiment, is comprised of a plurality of sub-modules that each perform a respective task in relation to autonomously operating the vehicle. That is, the autonomous driving module includes sub-modules that, in combination, determine travel path(s), current autonomous driving maneuvers for the vehicle 600, future autonomous driving maneuvers and/or modifications to current autonomous driving maneuvers. In general, to effectively operate the individual task-specific modules need to be trained using labeled data from different situations that the vehicle may encounter.

However, as previously noted, acquiring this training data, especially when targeted to a particular task module, can represent a significant difficulty. Therefore, the adaptation system 100 can be employed to generate training data for training various sub-modules by translating synthetic images with task-specific subject matter into photo-realistic images. Accordingly, the adaptation system 100, in one embodiment, provides training data (e.g., labeled photorealistic images) to one or more of the sub-modules or components thereof as manner of more efficiently generating training data.

With further reference to FIG. 1, the adaptation system 100 is shown as including a processor 110. Accordingly, the processor 110 may represent a distributed processing resource, an individual local processor (e.g., a CPU, GPU, or application specific processor), or the adaptation system 100 may access the processor 110 through a data bus or another communication path. In one embodiment, the adaptation system 100 includes a memory 120 that stores an image module 130 and a translation module 140. The memory 120 is a random-access memory (RAM), read-only memory (ROM), a hard-disk drive, a flash memory, a processor cache, or other suitable memory for storing the modules 130 and 140. The modules 130 and 140 are, for example, computer-readable instructions that when executed by the processor 110 cause the processor 110 to perform the various functions disclosed herein.

Moreover, as previously noted, in various embodiments, one or more aspects of the adaptation system 100 are implemented as cloud-based services, and so on. Thus, one or more components of the adaptation system 100 may be located remotely from other components and may be implemented in a distributed manner. As an additional matter, the adaptation system 100 includes the database 150 as a means of storing various data elements. The database 150 is, in one embodiment, an electronic data structure stored in the memory 120 or a separate electronic data store and that is configured with routines that can be executed by the processor 110 for analyzing stored data, providing stored data, organizing stored data, and so on. Thus, in one embodiment, the database 150 stores data used by the modules 130 and 140 in executing various functions. In the embodiment depicted in FIG. 1, the database 150 includes the synthetic image(s) 160, a generative module 170, and/or other information that is used by the modules 130 and/or 140.

Continuing with the image module 130, in one embodiment, the image module 130 generally includes instructions that function to control the processor 110 to acquire the synthetic image 160. The image module 130 electronically receives the synthetic image 160 from a simulator or other electronic source that generates the synthetic image 160. In one embodiment, such sources generate the synthetic image 160 according to a particular perception task (e.g., road obstacle detection) that is to be trained, according to a particular driving scene, according to requested object instances that are to be depicted, or another criteria. Accordingly, the synthetic images 160 can be provided in various configurations that are directed to training different modules on different tasks. The synthetic image 160 may be provided as an RGB full-color image, as a false color image, or according to another preferred format depending on the particular training task.

Moreover, in further aspects, the image module 130 generates the synthetic image 160 itself using an integrated simulator. For example, the image module 130 may accept text describing a driving scene from which the image module 130 generates the synthetic images 160 or at least identifies the synthetic image 160 from a stored set of computer-generated images. Furthermore, the synthetic image 160 is, in one embodiment, semantically segmented such that object instances within the synthetic image 160 are labeled pixel-by-pixel. This labeling of the synthetic image 160 is generally provided along with the synthetic images 160 as may be known by the simulator from the original generation of the image 160 or from a subsequent analysis through the application of a semantic segmentation algorithm. Accordingly, in one embodiment, the image module 130 performs the semantic segmentation in order to generate the labels for the synthetic image 160 if the labels are not already present.

As a further matter, while the adaptation system 100 is discussed from the perspective of operating upon or with the synthetic image 160 in a singular form, of course, the adaptation system 100 can perform the disclosed functions on a plurality of the synthetic images 160 in parallel, as a batch process, or in another suitable form.

With continued reference to FIG. 1, in one embodiment, the translation module 140 generally includes instructions that function to control the processor 110 to compute translated components of an improved/new image from simulated components within the synthetic image 160. As previously explained, the synthetic image 160 includes different object instances that are semantically labeled such that pixels associated with each of the different object instances are also labeled. This style of labeling the image 160 results in, for example, generally complete delineations between the object instances such that the synthetic image 160 is wholly labeled on a pixel-by-pixel basis. Accordingly, the labels for the synthetic image 160 distinguish between separate simulated components of the synthetic image 160 that are depicted therein.

As such, the translation module 140, in one embodiment, separately computes the translated components from corresponding simulated components. Thus, in one approach, the translation module 140 separately feeds the synthetic image 160 or at least the separate simulated components thereof into a generative module 170 that computes the translated components through application of one or more transforms to the simulated components. In one embodiment, the generative module 170 executes a plurality of machine learning models to separately generate the translated components of the new image. In general, the generative module 170 is fully differentiable thereby providing for executing the separate models included therein in parallel. Moreover, because of the differentiable characteristics of the generative module 170, the generative module 170, in one more embodiment, is implemented in a distributed cloud-based computing environment.

Moreover, the separate models implemented within the generative module 170 are, for example, neural networks, and, in particular, are generative adversarial networks (GANs). Thus, as generally provided for within the separate GANs implemented within the generative module 170, each includes at least a generator and a discriminator. The generator is, in one embodiment, trained to generate translated components for a particular object instance (e.g., road, vehicle, pedestrian, etc.) to fool the discriminator, whereas the discriminator associated with a particular generator is, for example, optimized to distinguish between real images of the particular object instance and translated versions that approximate the real images. In particular, the architecture of the generator within the individual models includes, in one embodiment, two stride-2 convolutions, several residual blocks, and two fractionally-strided convolutions with stride ½. In one embodiment, the discriminator is a patch GAN that functions to classify overlapping image patches (i.e., sub-regions of 70×70 pixels). Of course, while a particular configuration is discussed for the GANs, in further embodiments, the particular configuration of the models may vary to include different types of GANs or GANs with different characteristics.

Moreover, the particular implementation of each of the separate models within the generative module 170 may also vary such that the plurality of machine learning models differs according to, for example, a particular object instance that correlates with the model. That is, in one embodiment, different models may be implemented within the generative module 170 to improve on computing the translated components for particular object instances since certain classes of objects can include characteristics which may be better suited for a particular implementation of model. Thus, the landscape of models may vary in type and in characteristics as implemented within the generative module 170 in addition to distinct training according to separate semantic object classes.

Furthermore, the separate models may be implemented in different arrangements. That is, in one approach, the GANs or other models may be implemented in a stack configuration where each model separately processes a simulated component to produce a translated component. In such a configuration a single GAN may process each separate object class within the synthetic image 160. By contrast in further approaches, the arrangement of models within the generative module 170 is hierarchical with successive layers refining outputs of previous layers until the translated components are photo-realistic and are provided as electronic outputs of the hierarchy. Accordingly, the hierarchy, in one or more embodiments, is a tree of models, a plurality of stacks, a chain or another suitable implementation.

Figure 2:
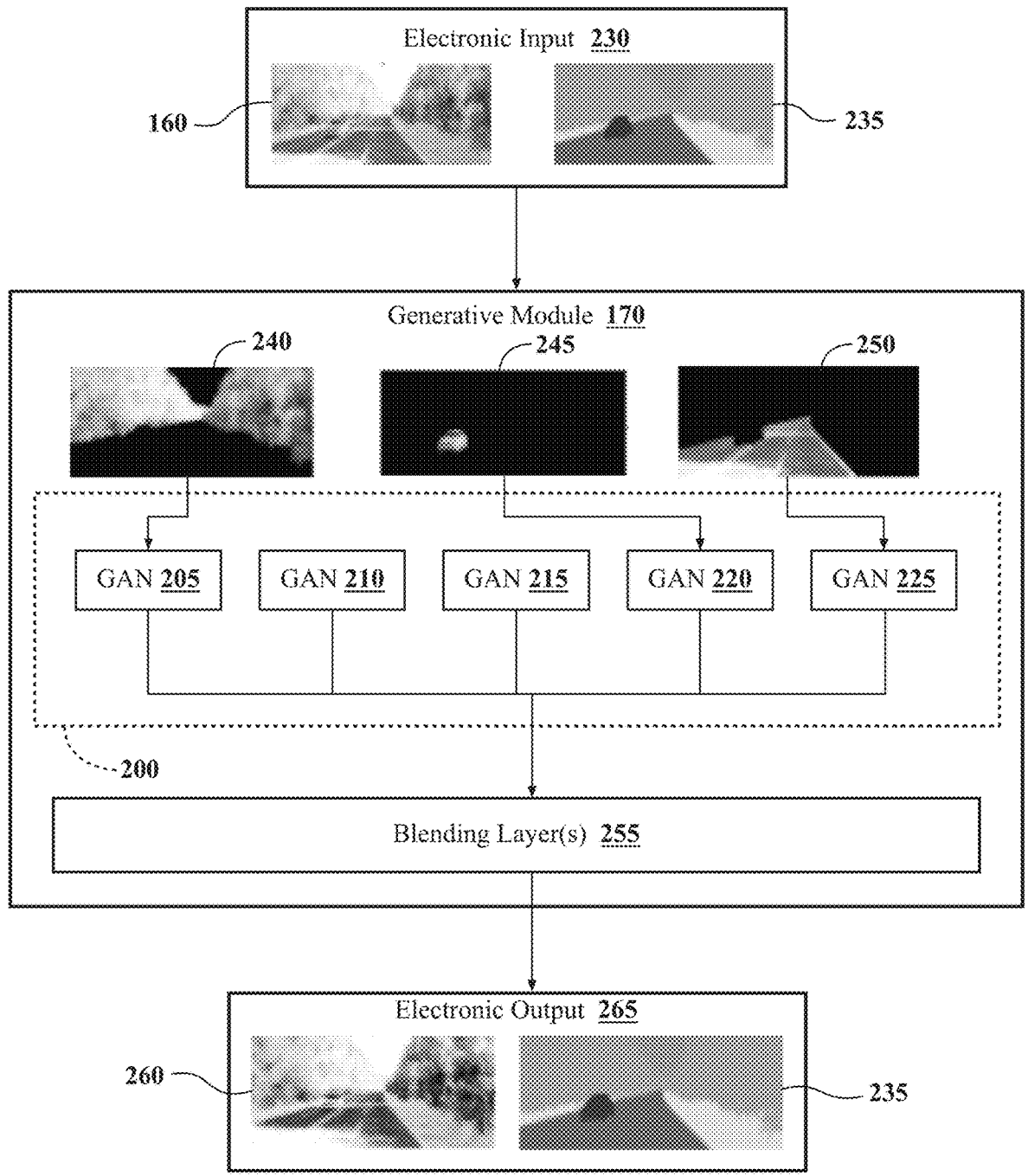
FIG. 2 illustrates one example of an architecture of a generative module as embodied herein.
Figure 3:
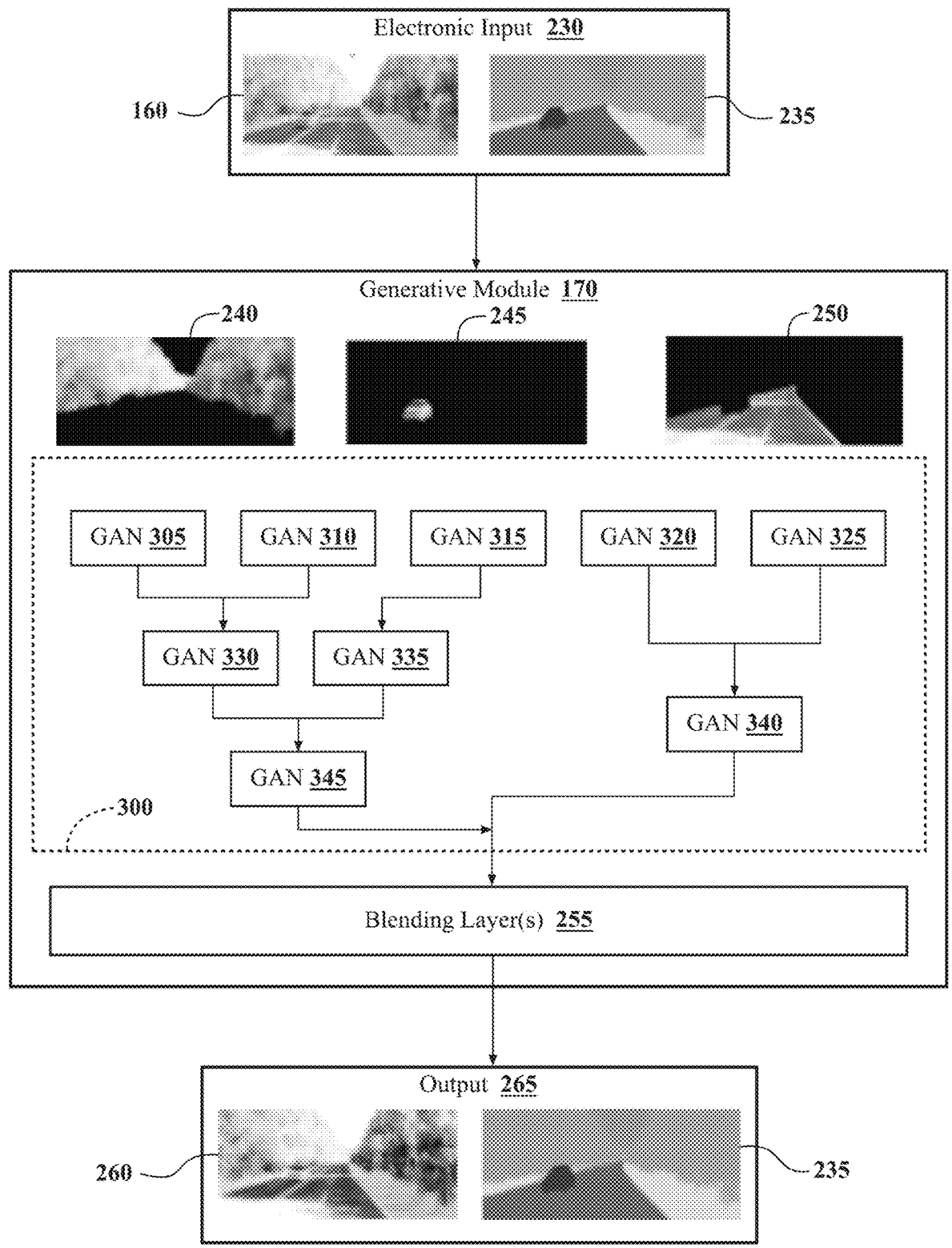
FIG. 3 illustrates a further example of a hierarchical architecture of a generative module as embodied herein.

By way of example, briefly consider FIGS. 2 and 3, which illustrate different embodiments of the generative module 170. FIG. 2 illustrate an arrangement 200 of models 205, 210, 215, 220, and 225 (hereinafter collectively referred to as 205-225) where the models 205-225 are provided in a stack arrangement with each separate one of the models 205-225 corresponding to a separate object instance. For example, as shown in FIG. 2, an electronic input 230 to the generative module 170 includes the synthetic image 160 along with labels 235 of the different object instances within the synthetic image 160. As depicted in FIG. 2, the simulated components fo the synthetic image 160 are shown as being segmented from the synthetic image 160 itself; however, this segmentation is provided for purposes of illustrating how the separate models 205-225 each separately transform different ones of the simulated components 240, 245, and 250. Moreover, as shown the synthetic image 160 is comprised of three different object instances and thus is provided as input to three separate models since the embodiment shown in FIG. 2 generally functions with a one-to-one correspondence between classes of objects and models. Of course, for purposes of illustration the arrangement 200 is shown as including five separate models. However, in various embodiments, the number of models included in the generative module 170 generally corresponds to the number of object classes that may be translated.

With reference to FIG. 3, an additional embodiment of the generative module 170 is illustrated in which an arrangement 300 of models includes a hierarchy of GANs. In particular, the illustrated arrangement 300 includes GANs in both a tree-like relationship and in a chain or successive stack arrangement. As shown, the arrangement 300 includes GANs 305, 310, 315, 320, 325, 330, 335, 340, and 345. As mentioned previously, the GANs may be cycle-consistent GANs, or another form of generative machine learning model that accepts the simulated components and computes the translated components therefrom. Thus, the hierarchy illustrated along with FIG. 3 generally functions by, for example, successively refining outputs from previous layers.

By way of example, as the simulated component 245 is fed to a GAN 315 that is specific to an associated object class (e.g., vehicles), the GAN 315 performs initial processing on the simulated component 245 to produce an intermediate version. The intermediate version may be refined in comparison to the original component 245 but, for example, may still lack appropriate lighting or some other aspects that support a final photorealistic approximation. Accordingly, the additional GANs 335 and 345 further refine the output of the GAN 315 to produce a translated component for the simulated component 245 that is photorealistic. In various embodiments, the particular refinements at each successive layer of the hierarchy and along each particular path through the hierarchy may vary but can include improving resolution, adjusting colors/textures, and so on.

Moreover, it should be appreciated that each of the separate models depicted in the generative module 170 are, in one embodiment, fully differentiable and thus may be executed in parallel such that the separate translated components can be generated simultaneously. Furthermore, the illustrated hierarchy of FIG. 3 is not provided in a symmetric configuration or as conforming to a particular type of structure but instead represents a general hierarchy of models as may be implemented. In further aspects, the hierarchy may be symmetric and/or conform with standardized hierarchies (e.g., binary tree) but more generally the particular arrangement is not confined to such approaches and is instead considered to be flexible according to various considerations of different implementations (e.g., different models, different object classes, etc.).

In either case, the generative module 170 of both FIG. 2 and FIG. 3 is further illustrated as including a blending layer 255 that accepts the translated components produced by the respective GANs and blends the translated components into a new image 260. The blending layer 255, in one embodiment, computes the new image 160 through applying a weighted summation to the translated components received from the models. In further embodiments, the blending layer 255 is itself a separate machine learning model such as a convolutional neural network (CNN) or another model that is trained to produce photorealistic images from constituent parts.

Accordingly, the generative module 170 provides the new image 260 along with the labels 235 as an electronic output 265. As a further matter, while the generative module 170 is illustrated as a separate component that is stored within the database 150, in further embodiments, the generative module 170 is integrated with the translation module 140, is accessed as a cloud-based service through functionality of the translation module 140, or is provided in another suitable form that is accessible to the adaptation system 100. In either case, the new image 260 is, for example, a photo-realistic translation of the synthetic image 160.

Figure 4:
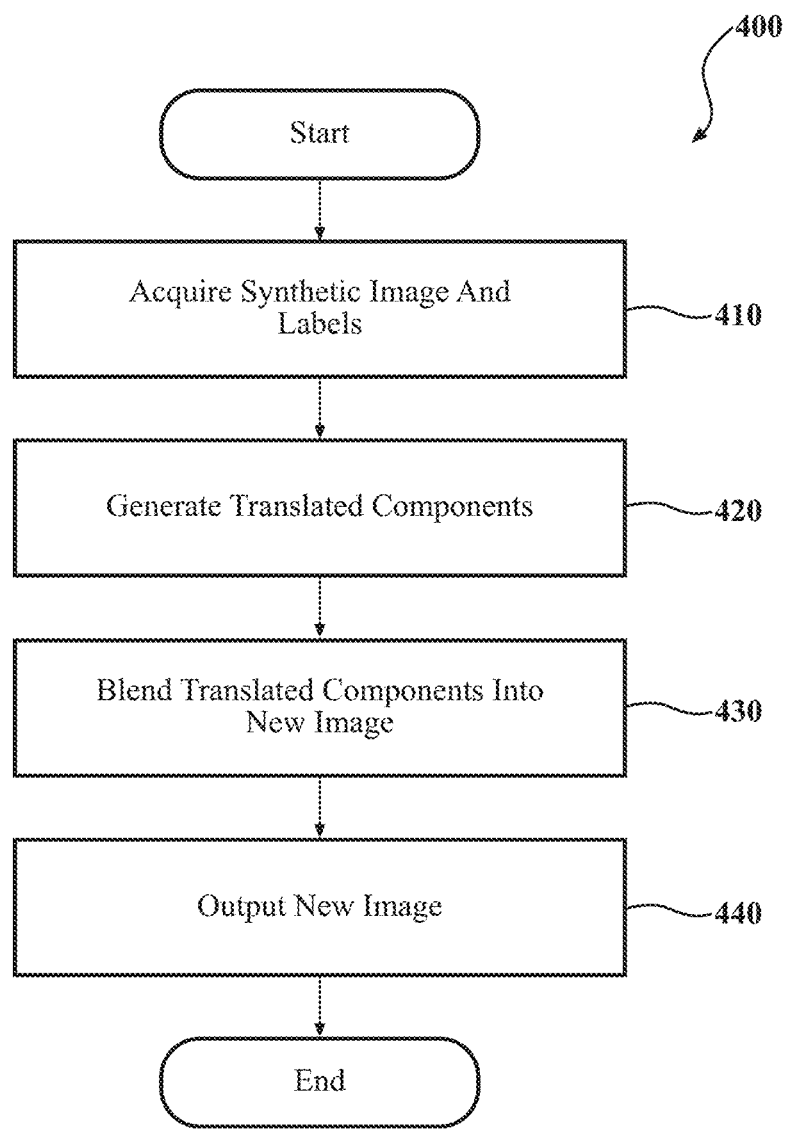
FIG. 4 illustrates one embodiment of a method associated with translating a synthetic image into a photo-realistic image.

Additional aspects of generating images in a photorealistic format will be discussed in relation to FIG. 4. FIG. 4 illustrates a flowchart of a method 400 that is associated with implementing a generative module to compute improved computer-generated images. Method 400 will be discussed from the perspective of the adaptation system 100 of FIG. 1. While method 400 is discussed in combination with the adaptation system 100, it should be understood that the method 400 is not limited to being implemented within the adaptation system 100 but is instead one example of a system that may implement the method 400.

At 410, the image module 130 acquires the synthetic image 160 including identified labels of simulated components within the synthetic image 160. As previously discussed, in one embodiment, the synthetic image 160 is a simulated visualization that may be produced by a simulator or other electronic source and that includes identified labels distinguishing between the simulated components (i.e., object instances) within the synthetic image 160. In general, the synthetic image 160 may portray a driving scene of a road and a surrounding environment from a perspective of a vehicle. However, in further applications, the synthetic image 160 may be generated to depict any visual arrangement of objects such that the objects correspond with classes of objects that the generative module 170 is trained to improve into a photorealistic form.

Accordingly, at 410, the image module 130, in one embodiment, acquires the synthetic image 160 by loading a set of synthetic images 160 into electronic memory from a data store (e.g., database 150) or receiving the synthetic images 160 from a communication link with a remote system (e.g., cloud-based system). In either case, the image module 130 acquires the synthetic images 160, which are also provided with, in one embodiment, the labels identifying associated classes of object instances depicted in the image 160. In a further embodiment, the image module 130 generates the labels when not originally present by semantically segmenting the separate synthetic images 160 to distinguish the simulated components therein on a pixel-by-pixel basis. That is, each pixel within the synthetic image 160 is labeled and associated with a particular object class that is depicted. In various embodiments, the image module 130 executes a semantic segmentation algorithm such as a neural network that is trained on such a task to produce the labels. Of course, as presented, the original source of the synthetic image 160 may generate the labels as a function of originally generating the image or as a secondary process. In either case, the labels are present as a preliminary requirement for proceeding with the improvement of the image 160.

At 420, the translation module 140 computes translated components that visually approximate real instances of the simulated components by using the generative module 170. As explained in detail previously, the generative module 170 is comprised of neural networks (e.g., GANs) or other machine learning models that are configured to separately generate the translated components from respective simulated components. Thus, the translation module 140 uses the generative module 170 to produce a photo-realistic form of the synthetic image 160 that is realized as the new image, and that includes the same labels as the original synthetic image 160. Thus, translation module 140, in one embodiment, controls the generative module 170 by feeding the simulated components along with associated labels into the respective networks. That is, because the generative module 170 generally includes a plurality of input paths that are separately associated with different ones of the models trained for improving separate object classes, the translation module 140 can separately provide the synthetic image 160 along with relevant labels on the separate input paths. Accordingly, depending on a particular implementation of the generative module 170, the translation module 140 then causes the models along the paths to produce the translated components from the simulated components.

It should be appreciated that the models within the generative module 170 can accept the synthetic image 160 as a whole even though generating sub-components of the new image in order to, for example, better inform lighting and other aspects of how the translated components are produced. Of course, in further examples, the models within the generative module 170 may generate the photorealistic components in isolation from other aspects of the image 160. As such, successive models in the hierarchy can be configured to provide refinements in the realism of the translated component itself or in relation to other aspects of the image.

At 430, the translation module 140 blends the translated components together to produce a new image that is photorealistic. As used herein, the photo-realistic image refers to an image that is computer-generated yet is generally indistinguishable from a real image acquired by a camera imaging a real-world scene. Accordingly, the new image is a photo-realistic image that approximates real-world scenes and is generally indistinguishable according to at least a discriminator of the generative module 170.

As such, the translation module 140 blends the translated components together into the new image by combining the translated components into the new image. In one embodiment, the translation module 140 employs a further blending model that is a machine learning algorithm within the generative module 170 that generates an intermediate image according to a weighted summation of the translated components and refines the intermediate image according to one or more convolutions to generate the new image. In further aspects, the blending model includes additional operations to further refine the intermediate image and seamlessly combine the translated components.

At 440, the translation module 140 provides the new image as an electronic output. In one embodiment, the translation module 140 stores the new image in an electronic memory (e.g., 120) or another suitable electronic data store until the new image is to be employed for training a particular task module or for another purpose. Also, as previously indicated, the new image includes the identified labels for object instances depicted therein as carried over from the original synthetic image 160. In this way, the adaptation system 100 generates labeled images that are photorealistic from the synthetic images such that the generated photorealistic images can be interchangeably used in place of real images to train machine learning algorithms on various tasks. Moreover, because the images are computer-generated, the content of the images can be directed to task-specific subject matter that may prove difficult to collect manually. Thus, the present approach to generating photorealistic images that innately include object labels improves training of machine learning models such that the training is more cost effective and efficient.

As a further matter, it should be appreciated that the process discussed along with method 400 can be implemented in an iterative fashion to process many synthetic images. Moreover, the discussed functions of the method 400 are generally differentiable and can thus be executed in parallel for the same or different images.

Figure 5:
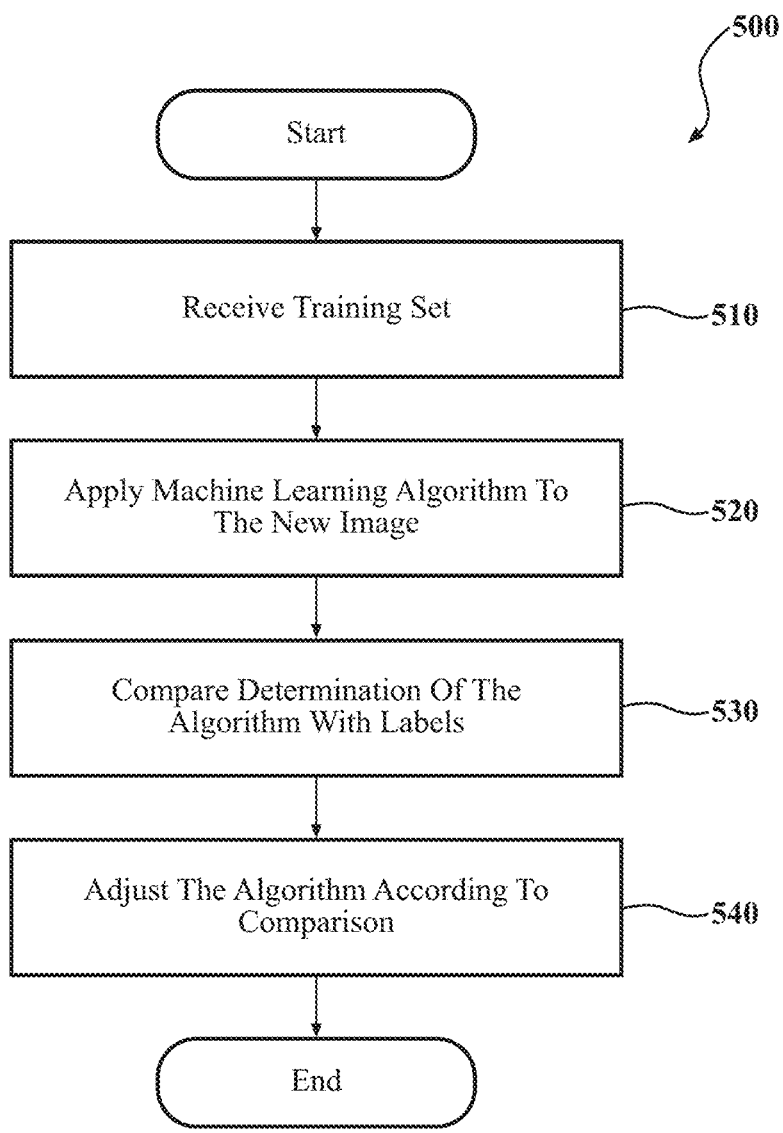
FIG. 5 illustrates one embodiment of a method associated with training a machine learning algorithm using the improved synthetic images generated by the system and method disclosed herein.

FIG. 5 illustrates a flowchart of a method 500 that is associated with training a task-specific module using computer-generated images such as those produced by the adaptation system 100. Method 500 will be discussed from the perspective of the adaptation system 100 of FIG. 1. However, it should be understood that the method 500 is not limited to being implemented within the adaptation system 100, but is instead one example of a system that may implement the method 500.

At 510, the adaptation system 100 receives a training set of images. In one embodiment, the adaptation system 100 generates the training set and stores the training set in the database 150 or another suitable storage location until needed. Thus, the adaptation system 100, at 510, loads the training set which is comprised of a plurality of new images that have been improved into photo-realistic images from coarser synthetic images 160. As previously mentioned, the synthetic images 160 may be initially generated to be directed at depictions of subject matter that relates to a particular task of a module being trained. Thus, the photo-realistic images can depict particular selected subject matter that relates to training the module on a specific task (e.g., obstacle detection, collision avoidance, etc.).

At 520, the adaptation system 100 processes the photo-realistic image using the module that is being trained. In one embodiment, the module is a machine learning model such as a neural network or similar model that is trained through a process of backpropagation using a set of representative input data that includes labeled information in order to compare outputs of the model with expected results embodied by the labels and correct the module accordingly. In one embodiment, the module is a sub-module of the autonomous driving module 660 that is a task-specific module supporting an overall function of the autonomous driving module 660. Thus, the adaptation system 100 executes the model at 520 to generate a result.

At 530, the adaptation system 100 compares the result from 520 with labels of the image to determine an extent of correlation in the provided result and an expected result. In one embodiment, the correlation is provided as a score whereas in further embodiments the correlation is provided as a binary operator indicating whether the result is correct or not. In either case, the adaptation system 100 assesses the result at 530 using the included labels of the photorealistic image.

At 540, the adaptation system 100 adjusts the module according to the determination at 530. That is, in various embodiments, the adaptation system 100 may include a training algorithm or another mechanism that alters internal weighting or other characteristics of the module according to the comparison. In this way, the adaptation system 100 can use the electronically generated photorealistic images to train a module on a particular task. As an additional note, while the training is discussed in relation to a single image, in various embodiments, the training may span a process of a plurality of generated images and associated labels.

Figure 6:
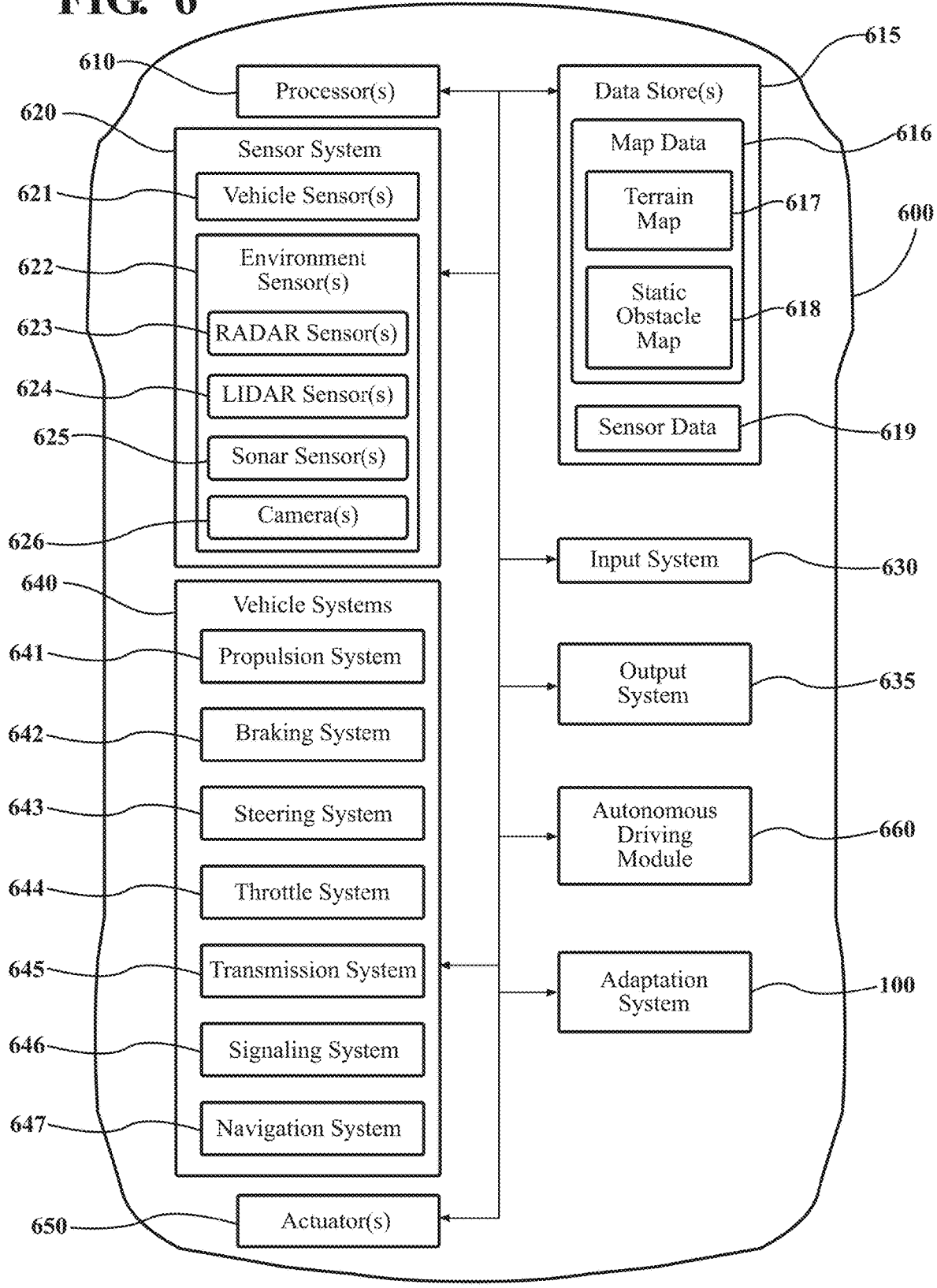
FIG. 6 illustrates one embodiment of a vehicle within which systems and methods disclosed herein may be implemented.

As an additional example of an implementation of at least a portion of the adaptation system 100, an example vehicle 600 will now be discussed in relation to FIG. 6. FIG. 6 represents an example environment within which the system and methods disclosed herein may operate. In some instances, the vehicle 600 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 600 can be a conventional vehicle that is configured to operate in only a manual mode.

In one or more embodiments, the vehicle 600 is an autonomous vehicle. As used herein, "autonomous vehicle" refers to a vehicle that operates in an autonomous mode to self-drive without control inputs from a human driver. "Autonomous mode" refers to navigating and/or maneuvering the vehicle 600 along a travel route using one or more computing systems to control the vehicle 600 with minimal or no input from a human driver. In one or more embodiments, the vehicle 600 is highly automated or completely automated. In one embodiment, the vehicle 600 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 600 along a travel route.

The vehicle 600 can include one or more processors 610. In one or more arrangements, the processor(s) 610 can be a main processor of the vehicle 600. For instance, the processor(s) 610 can be an electronic control unit (ECU). The vehicle 600 can include one or more data stores 615 for storing one or more types of data. The data stores 615 can include volatile and/or non-volatile memory. Examples of suitable data stores 615 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 615 can be a component of the processor(s) 610, or the data store 615 can be operatively connected to the processor(s) 610 for use thereby. The term "operatively connected," as used throughout this description, can include direct or indirect connections, including connections without direct physical contact.

In one or more arrangements, the one or more data stores 615 can include map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The terrain maps 617 can include information about the ground, terrain, roads, surfaces, and/or other features of one or more geographic areas. The terrain maps 617 can include elevation data in the one or more geographic areas. The map data 616 can be high quality and/or highly detailed. The terrain maps 617 can define one or more ground surfaces, which can include paved roads, unpaved roads, land, and other things that define a ground surface.

In one or more arrangements, the map data 616 can include one or more static obstacle maps 618. The static obstacle map(s) 618 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 618 can have location data, size data, dimension data, material data, and/or other data associated with it. The static obstacle map(s) 618 can include measurements, dimensions, distances, and/or information for one or more static obstacles. The static obstacle map(s) 618 can be high quality and/or highly detailed. The static obstacle map(s) 618 can be updated to reflect changes within a mapped area.

The one or more data stores 615 can include sensor data 619. In this context, "sensor data" means any information about the sensors that the vehicle 600 is equipped with, including the capabilities and other information about such sensors. As will be explained below, the vehicle 600 can include the sensor system 620. The sensor data 619 can relate to one or more sensors of the sensor system 620. As an example, in one or more arrangements, the sensor data 619 can include information on one or more LIDAR sensors 624 of the sensor system 620.

In some instances, at least a portion of the map data 616 and/or the sensor data 619 can be located in one or more data stores 615 located onboard the vehicle 600. Alternatively, or in addition, at least a portion of the map data 616 and/or the sensor data 619 can be located in one or more data stores 615 that are located remotely from the vehicle 600.

As noted above, the vehicle 600 can include the sensor system 620. The sensor system 620 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 620 includes a plurality of sensors, the sensors can work independently from each other. Alternatively, two or more of the sensors can work in combination with each other. In such case, the two or more sensors can form a sensor network. The sensor system 620 and/or the one or more sensors can be operatively connected to the processor(s) 610, the data store(s) 615, and/or another element of the vehicle 600 (including any of the elements shown in FIG. 6). The sensor system 620 can acquire data of at least a portion of the external environment of the vehicle 600.

The sensor system 620 can include any suitable type of sensor. Various examples of different types of sensors will be described herein. However, it will be understood that the embodiments are not limited to the particular sensors described. The sensor system 620 can include one or more vehicle sensors 621. The vehicle sensors 621 can detect, determine, and/or sense information about the vehicle 600 itself. In one or more arrangements, the vehicle sensors 621 can be configured to detect, and/or sense position and orientation changes of the vehicle 600, such as, for example, based on inertial acceleration. In one or more arrangements, the vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The vehicle sensors 621 can be configured to detect, and/or sense one or more characteristics of the vehicle 600. In one or more arrangements, the vehicle sensors 621 can include a speedometer to determine a current speed of the vehicle 600.

Alternatively, or in addition, the sensor system 620 can include one or more environment sensors 622 configured to acquire, and/or sense driving environment data. "Driving environment data" includes data or information about the external environment in which an autonomous vehicle is located or one or more portions thereof. For example, the one or more environment sensors 622 can be configured to detect, quantify and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify and/or sense other things in the external environment of the vehicle 600, such as, for example, lane markers, signs, traffic lights, traffic signs, lane lines, crosswalks, curbs proximate the vehicle 600, off-road objects, etc.

Various examples of sensors of the sensor system 620 will be described herein. The example sensors may be part of the one or more environment sensors 622 and/or the one or more vehicle sensors 621. However, it will be understood that the embodiments are not limited to the particular sensors described. As an example, in one or more arrangements, the sensor system 620 can include one or more radar sensors 623, one or more LIDAR sensors 624, one or more sonar sensors 625, and/or one or more cameras 626. In one or more arrangements, the one or more cameras 626 can be high dynamic range (HDR) cameras or infrared (IR) cameras.

The vehicle 600 can include an input system 630. An "input system" includes any device, component, system, element or arrangement or groups thereof that enable information/data to be entered into a machine. The input system 630 can receive an input from a vehicle passenger (e.g., a driver or a passenger). The vehicle 600 can include an output system 635. An "output system" includes any device, component, or arrangement or groups thereof that enable information/data to be presented to a vehicle passenger (e.g., a person, a vehicle passenger, etc.).

The vehicle 600 can include one or more vehicle systems 640. Various examples of the one or more vehicle systems 640 are shown in FIG. 6. However, the vehicle 600 can include more, fewer, or different vehicle systems. It should be appreciated that although particular vehicle systems are separately defined, each or any of the systems or portions thereof may be otherwise combined or segregated via hardware and/or software within the vehicle 600. The vehicle 600 can include a propulsion system 641, a braking system 642, a steering system 643, throttle system 644, a transmission system 645, a signaling system 646, and/or a navigation system 647. Each of these systems can include one or more devices, components, and/or combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system or a geolocation system.

The processor(s) 610 (and/or processor 110), the adaptation system 100, and/or the autonomous driving module(s) 660 can be operatively connected to communicate with the various vehicle systems 640 and/or individual components thereof. For example, returning to FIG. 6, the processor(s) 610 and/or the autonomous driving module(s) 660 can be in communication to send and/or receive information from the various vehicle systems 640 to control the movement, speed, maneuvering, heading, direction, etc. of the vehicle 600. The processor(s) 110, the adaptation system 100, and/or the autonomous driving module(s) 660 may control some or all of these vehicle systems 640 and, thus, may be partially or fully autonomous.

The processor(s) 110, the adaptation system 100, and/or the autonomous driving module(s) 660 can be operatively connected to communicate with the various vehicle systems 640 and/or individual components thereof. For example, returning to FIG. 6, the processor(s) 610, the adaptation system 100, and/or the autonomous driving module(s) 660 can be in communication to send and/or receive information from the various vehicle systems 640 to control the movement, speed, maneuvering, heading, direction, etc. of the vehicle 600. The processor(s) 110, the adaptation system 100, and/or the autonomous driving module(s) 660 may control some or all of these vehicle systems 640. For example, the processor 610, in one embodiment, controls the camera 126 to acquire images of an area surrounding the vehicle, which are then provided to the adaptation system 100 to extract content about the environment so that the autonomous driving module 660 can make determinations about how to control the vehicle 600.

The processor(s) 610, the adaptation system 100, and/or the autonomous driving module(s) 660 may be operable to control the navigation and/or maneuvering of the vehicle 600 by controlling one or more of the vehicle systems 640 and/or components thereof. For instance, when operating in an autonomous mode, the processor(s) 610, the adaptation system 100, and/or the autonomous driving module(s) 660 can control the direction and/or speed of the vehicle 600. The processor(s) 610, the adaptation system 100, and/or the autonomous driving module(s) 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 600 can include one or more actuators 650. The actuators 650 can be any element or combination of elements operable to modify, adjust and/or alter one or more of the vehicle systems 640 or components thereof to responsive to receiving signals or other inputs from the processor(s) 610 and/or the autonomous driving module(s) 660. Any suitable actuator can be used. For instance, the one or more actuators 650 can include motors, pneumatic actuators, hydraulic pistons, relays, solenoids, and/or piezoelectric actuators, just to name a few possibilities.

The vehicle 600 can include one or more modules, at least some of which are described herein. The modules can be implemented as computer-readable program code that, when executed by a processor 610, implement one or more of the various processes described herein. One or more of the modules can be a component of the processor(s) 610, or one or more of the modules can be executed on and/or distributed among other processing systems to which the processor(s) 610 is operatively connected. The modules can include instructions (e.g., program logic) executable by one or more processor(s) 610. Alternatively, or in addition, one or more data store 615 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more autonomous driving modules 660. The autonomous driving module(s) 660 can be configured to receive data from the sensor system 620 and/or any other type of system capable of capturing information relating to the vehicle 600 and/or the external environment of the vehicle 600. In one or more arrangements, the autonomous driving module(s) 660 can use such data to generate one or more driving scene models. The autonomous driving module(s) 660 can determine position and velocity of the vehicle 600. The autonomous driving module(s) 660 can determine the location of obstacles, objects, or other environmental features including traffic signs, trees, shrubs, neighboring vehicles, pedestrians, etc.

The autonomous driving module(s) 660 can be configured to receive, and/or determine location information for obstacles within the external environment of the vehicle 600 for use by the processor(s) 610, and/or one or more of the modules 660 described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The autonomous driving modules 660 either independently or in combination can be configured to determine travel path(s), current autonomous driving maneuvers for the vehicle 600, future autonomous driving maneuvers and/or modifications to current autonomous driving maneuvers based on data acquired by the sensor system 620, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The autonomous driving module(s) 660 can be configured to implement determined driving maneuvers. The autonomous driving module(s) 660 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 660 can be configured to execute various vehicle functions and/or to transmit data to, receive data from, interact with, and/or control the vehicle 600 or one or more systems thereof (e.g. one or more of vehicle systems 640).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptation system for improving generation of realistic images, comprising:
   one or more processors;
   a memory communicably coupled to the one or more processors and storing:
   an image module including instructions that when executed by the one or more processors cause the one or more processors to acquire a synthetic image including identified labels of simulated components within the synthetic image, wherein the synthetic image is a simulated visualization, and the identified labels distinguish between the simulated components within the synthetic image; and
   a translation module including instructions that when executed by the one or more processors cause the one or more processors to compute, from the simulated components, translated components that visually approximate real instances of the simulated components by using a generative module comprised of neural networks that are configured to separately generate the translated components,
   wherein the translation module includes instructions to blend the translated components together to produce a new image from the simulated components of the synthetic image.

2. The adaptation system of claim 1, wherein the translation module includes instructions to compute the translated components using the generative module including instructions to separately generate the translated components using separate ones of the neural networks that correspond with semantic labels matching the identified labels, and wherein the neural networks are generative adversarial networks (GANs) that are separately trained to translate the simulated components for a corresponding semantic class of objects.

3. The adaptation system of claim 2, wherein the translation module includes instructions to compute the translated components using the generative module including instructions to generate the translated components according to a hierarchy of the neural networks, and wherein the neural networks are arranged in layers with successive ones of the layers generating intermediate forms of the translated components that are iteratively refined until outputting the translated components at a final one of the layers.

4. The adaptation system of claim 2, wherein the neural networks are cycle GANs, wherein the translation module includes instructions to compute the translated components using the generative module including instructions to generate the translated components according to the neural networks arranged into a stack with different ones of the neural networks generating the translated components for different ones of the semantic labels, and wherein the neural networks are differentiable and execute at least partially in parallel to generate the translated components.

5. The adaptation system of claim 1, wherein the translation module includes instructions to blend the translated components together into the new image including instructions to combine the translated components into an intermediate image according to a weighted summation and refining the intermediate image according to one or more convolutions to generate the new image.

6. The adaptation system of claim 1, wherein the image module includes instructions to acquire the synthetic image including instructions to receive the synthetic image from an image simulator and semantically segment the image to produce the identified labels for the simulated components, and wherein the identified labels indicate different semantic categories for the simulated components pixel-by-pixel within the synthetic image.

7. The adaptation system of claim 1, wherein the synthetic image portrays a driving scene of a road and a surrounding environment from a perspective of a vehicle, and wherein the image module includes instructions to acquire the synthetic image including instructions to load the synthetic image from an electronic data store.

8. The adaptation system of claim 1, wherein the translation module includes instructions to:
provide the new image with the identified labels corresponding to the translated components blended into the new image to a machine learning algorithm, and
train the machine learning algorithm using the new image and the identified labels.

9. A non-transitory computer-readable medium including instructions that when executed by one or more processors cause the one or more processors to:
acquire a synthetic image including identified labels of simulated components within the synthetic image, wherein the synthetic image is a simulated visualization and the identified labels distinguish between the simulated components within the synthetic image;
compute, from the simulated components, translated components that visually approximate real instances of the simulated components by using a generative module comprised of neural networks that are configured to separately generate the translated components; and
blend the translated components together to produce a new image from the simulated components of the synthetic image.

10. The non-transitory computer-readable medium of claim 9, wherein the instructions to compute the translated components using the generative module include instructions to separately generate the translated components using separate ones of the neural networks that correspond with semantic labels matching the identified labels, and wherein the neural networks are generative adversarial networks (GANs) that are separately trained to translate the simulated components for a corresponding semantic class of objects.

11. The non-transitory computer-readable medium of claim 10, wherein the instructions to compute the translated components using the generative module include instructions to generate the translated components according to a hierarchy of the neural networks, and wherein the neural networks are arranged in layers with successive ones of the layers generating intermediate forms of the translated components that are iteratively refined until outputting the translated components at a final one of the layers.

12. The non-transitory computer-readable medium of claim 10, wherein the neural networks are cycle GANs, wherein the instructions to compute the translated components using the generative module include instructions to generate the translated components according to the neural networks arranged into a stack with different ones of the neural networks generating the translated components for different ones of the semantic labels, and wherein the neural networks are differentiable and execute at least partially in parallel to generate the translated components.

13. The non-transitory computer-readable medium of claim 9, wherein the instructions to blend the translated components together into the new image include instructions to combine the translated components into an intermediate image according to a weighted summation and refining the intermediate image according to one or more convolutions to generate the new image,
wherein the instructions to acquire the synthetic image include instructions to receive the synthetic image from an image simulator and semantically segment the image to produce the identified labels for the simulated components, and wherein the identified labels indicate different semantic object classes for the simulated components pixel-by-pixel within the synthetic image.

14. A method of improving generation of realistic images, comprising:
acquiring a synthetic image including identified labels of simulated components within the synthetic image, wherein the synthetic image is a simulated visualization, and the identified labels distinguish between the components within the synthetic image;
computing, from the simulated components, translated components that visually approximate real instances of the simulated components by using a generative module comprised of neural networks that are configured to separately generate the translated components; and
blending the translated components together to produce a new image from the simulated components of the synthetic image.

15. The method of claim 14, wherein computing the translated components using the generative module includes separately generating the translated components using separate ones of the neural networks that correspond with semantic labels matching the identified labels, and wherein the neural networks are generative adversarial networks (GANs) that are separately trained to translate the simulated components for a corresponding semantic class of objects.

16. The method of claim 15, wherein computing the translated components using the generative module includes generating the translated components according to a hierarchy of the neural networks where the neural networks are arranged in layers with successive ones of the layers generating intermediate forms of the translated components that are iteratively refined until outputting the translated components at a final one of the layers.

17. The method of claim 15, wherein the neural networks are cycle GANs, wherein computing the translated components using the generative module includes generating the translated components according to the neural networks arranged into a stack with different ones of the neural networks generating the translated components for different ones of the semantic labels, and wherein the neural networks are differentiable and execute at least partially in parallel to generate the translated components.

18. The method of claim 14, wherein blending the translated components together into the new image includes combining the translated components into an intermediate image according to a weighted summation and refining the intermediate image according to one or more convolutions to generate the new image.

19. The method of claim 14, wherein acquiring the synthetic image includes receiving the synthetic image from an image simulator and semantically segmenting the image to produce the identified labels for the simulated components, wherein the identified labels indicate different semantic categories for the simulated components pixel-by-pixel within the synthetic image,
- wherein the synthetic image portrays a driving scene of a road and a surrounding environment from a perspective of a vehicle, and wherein acquiring the synthetic image includes loading the synthetic image from an electronic data store.

20. The method of claim 14, further comprising:
- providing the new image with the identified labels corresponding to the translated components blended into the new image to a machine learning algorithm; and
- training the machine learning algorithm using the new image and the identified labels.

* * * * *